United States Patent [19]

Van Loon

[11] Patent Number: 4,982,870
[45] Date of Patent: Jan. 8, 1991

[54] COMPOSITE PRESSURE VESSEL

[75] Inventor: Petrus J. M. Van Loon, Amsterdam, Netherlands

[73] Assignee: Shell Oil Company, Houston, Tex.

[21] Appl. No.: 522,700

[22] Filed: May 14, 1990

[30] Foreign Application Priority Data

Jul. 7, 1989 [GB] United Kingdom ................. 8915622

[51] Int. Cl.⁵ .............................................. B65D 1/16
[52] U.S. Cl. ........................................ 220/414; 220/3; 220/617
[58] Field of Search ....................... 220/3, 83, 414, 72, 220/71, 253, 76, 352

[56] References Cited

U.S. PATENT DOCUMENTS

| 925,135 | 6/1909 | Rudolph | 220/414 |
|---|---|---|---|
| 3,368,708 | 2/1968 | Pflederer | 220/3 |
| 3,648,881 | 3/1972 | Rogers | 220/414 |
| 3,989,562 | 11/1976 | Hladik et al. | 220/414 |
| 4,561,568 | 12/1985 | Hoffmeister et al. | 220/414 |
| 4,699,288 | 10/1987 | Moltan | 220/3 |

Primary Examiner—Joseph Man-Fu Moy

[57] ABSTRACT

A pressure vessel is disclosed comprising a first cylindrical wall for bearing circumferential loads, a second cylindrical wall for bearing axial loads, the walls being concentrically arranged, and two end caps arranged at opposite ends of the walls, which end caps are rigidly connected to the second cylindrical wall. At least one of the end caps is axially slidable relative to the first cylindrical wall. Sealing means are arranged between the first cylindrical wall and each slidable end cap.

9 Claims, 1 Drawing Sheet

U.S. Patent
Jan. 8, 1991
4,982,870
FIG.1
FIG.2
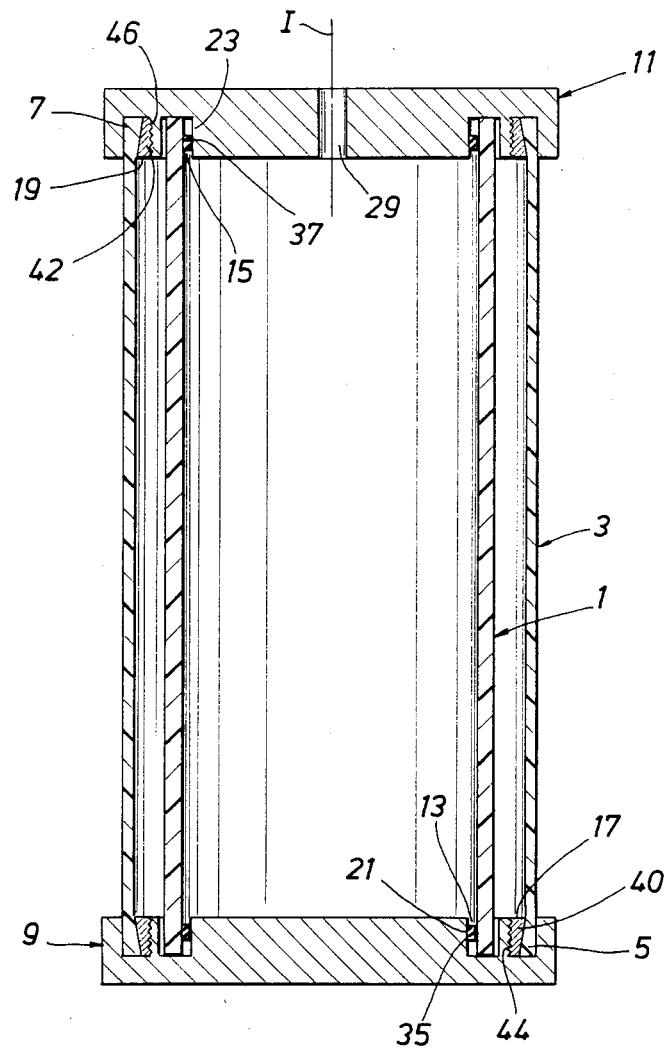
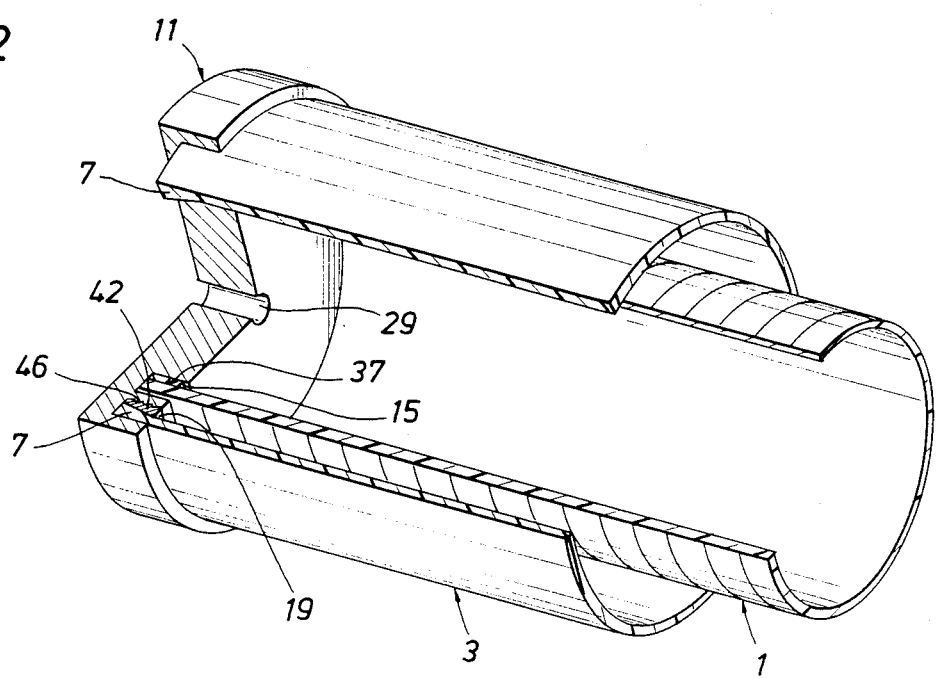

COMPOSITE PRESSURE VESSEL

BACKGROUND OF THE INVENTION

1. Field of the Invention

The invention relates to a pressure vessel having separate load-bearing components for circumferential and axial loads.

2. Description of the Prior Art

Generally, the maximum allowable interval pressure in a pressure vessel depends on the maximum allowable stresses in the load bearing components of the vessel. These allowable stresses are significantly higher in a vessel with separate load bearing components for axial and circumferential loads than in a conventional vessel with a single load bearing component for circumferential and axial loads. Therefore, the maximum allowable internal pressure in a pressure vessel with separate load bearing components can be significantly higher than in a conventional pressure vessel. Consequently, a pressure vessel with separate load bearing components can be designed lighter than a conventional vessel.

U.S. Pat. No. 3,368,708 discloses a pressure vessel comprising a cylindrical wall for bearing circumferential loads, means for bearing axial loads, two end caps arranged at opposite ends of the vessel and rigidly connected to the means for bearing axial loads, at least one of the end caps being axially slidable relative to the cylindrical wall, and sealing means arranged between the cylindrical wall and each slidable end cap.

In the known pressure vessel the means for bearing axial loads are the rods extending between the end caps. The tie rods pass through the interior of the vessel. The elevated fluid pressure inside the vessel exerts an outwardly oriented axial force to the end caps, which force is transmitted to the tie rods via the connecting points between the end caps and the tie rods. Consequently, inwardly oriented axial reaction forces are locally exerted by the tie rods to the end caps at said connecting points. The loading situation of the end caps is therefore asymmetrical with respect to the central longitudinal axis, leading to an asymmetrical deformation of the end caps. Such an asymmetrical deformation may impair the sealing means or lead to a skew position of the end caps relative to the central longitudinal axis.

SUMMARY OF THE INVENTION

It is an object of the invention to provide a pressure vessel which does not have these disadvantages, not even at high internal pressures.

To this end the pressure vessel according to the invention comprises a first cylindrical wall for bearing circumferential loads, a second cylindrical wall for bearing axial loads, said first and second walls being concentrically arranged, two end caps arranged at opposite ends of the vessel and rigidly connected to the second cylindrical wall, at least one of the end caps being axially slidable relative to the first cylindrical wall, and sealing means arranged between the first cylindrical wall and any slidable end cap. By the application of the second cylindrical wall for bearing axial loads, the end caps are symmetrically loaded, which results in symmetrical deformation of the end caps. The risk of failure of the vessel due to asymmetrical deformation of the end caps is thereby eliminated. A further advantage of the pressure vessel according to the invention is the increased impact resistance due to the application of a double wall.

Advantageously both end caps are axially slidable with respect to the first cylindrical wall. In this manner the axial displacement of each end cap relative to the first cylindrical wall, caused by the internal pressure, is limited to approximately half the axial displacement which occurs in case only one end cap is axially slidable. Such limited displacement imposes less stringent requirements to the sealing means.

More advantageously the first cylindrical is manufactured of fibre reinforced plastic such that the fibres extend substantially in the circumferential direction of the wall. By the orientation of the fibres in the circumferential direction, the strength of the first cylindrical wall is highest in the direction of the stress.

More advantageously the second cylindrical wall is manufactured of fibre reinforced plastic such that the fibres extend substantially in the axial direction of the wall. By the orientation of the fibres in the axial direction, the strength of the second cylindrical wall is highest in the direction of the stress.

More advantageously the thickness of the second cylindrical wall is at least half the thickness of the first cylindrical wall. In case the thickness of the second cylindrical wall is half the thickness of the first cylindrical wall the magnitudes of the stresses in the first and the second cylindrical wall are substantially equal. For safety reasons the thickness of the second cylindrical wall can be somewhat larger.

More advantageously thermal insulation material is arranged between the first cylindrical wall and the second cylindrical wall. The arrangement of the thermal insulation material between the walls prevents said insulation material from being damaged during handling of the vessel.

The invention will now be described by way of example in more detail with reference to the following drawings and detailed description, in which In the Drawings FIG. 1 shows schematically a longitudinal cross-section of a pressure vessel according to the invention; and FIG. 2 shows schematically a perspective view of the pressure vessel according to the invention, wherein part of the vessel is cut away.

DETAILED DESCRIPTION

The pressure vessel shown in FIGS. 1 and 2 comprises a first cylindrical wall in the form of an inner tube 1 and a second cylindrical wall in the form of an outer tube 3 arranged concentrically around the inner tube 1. Both tubes 1,3 are manufactured of a fibre reinforced thermoses or thermoplastic material. The fibres of the inner tube 1 extend in the circumferential direction, whereas the fibres of the outer tube 3 extend in the axial direction. The wall thickness of the inner tube 1 is twice the wall thickness of the outer tube 3. The outer tube 3 has tapered end parts 5,7.

Two end caps 9,11 are arranged at opposite ends of the tubes 1,3 and perpendicular to a central longitudinal axis I of the tubes 1,3. Each end cap 9,11 is provided with two concentrical annular grooves, i.e. an inner groove 13,15 and an outer groove 17,19. Each inner groove 13,15 has a cylindrical inner surface 21,23 of diameter slightly smaller than the internal diameter of the inner tube 1. One of the end caps 9,11 is provided with an central opening 29 for connection to a valve (not shown).

The inner tube 1 extends at both ends into the inner grooves 13,15 of the end caps 9,11. Sealing means in the form of metal or elastomeric sealing rings 35,37 are arranged in each inner groove 13,15, between the inner tube 1 and the cylindrical inner surface 21,23 of the inner groove 13,15, so as to seal the interior of the inner tube 1 from its exterior. Axial displacement of the end caps 9,11 relative to the inner tube 1 does not affect the sealing function of the sealing rings 35,37, at least as long as the inner tube 1 extends into the inner grooves 13,15.

Both tapered end parts 5,7 of the outer tube 3 extend into the outer grooves 17,19 of the end caps 9,11. The end parts 5,7 are locked in the outer grooves 17,19 by tapered steel rings 40,42 which are connected to the outer grooves 15,19 by screw thread connections 44,46. In this way a firm connection between the outer tube 3 and each end cap 9,11 is obtained.

During normal use of the pressure vessel according to the invention, the interior of the vessel is filled with compressed gas or fluid possibly also low temperature. Leakage of the fluid or gas from the interior is prevented by the sealing rings 35,37. The fluid or gas exerts a radial load on the inner tube 1, and an axial load on the end caps 9,11.

The pressure radially acting on the inner tube 1 generates hoop stress in the wall of the inner tube 1. This hoop stress induces radial expansion and axial contraction of the inner tube 1. The hoop stress in the inner tube 1 is mainly carried by the circumferentially extending fibres of the inner tube 1.

The pressure axially acting on the end caps 9,11 is transferred as a thrust load via the steel rings 40,42 to the outer tube 3. The thrust load generates axial stress in the wall of the outer tube 3, which axial stress induces an axial elongation of the outer tube 3. The axial stress in the outer tube 3 is mainly carried by the axially extending fibres of the outer tube 3.

The magnitudes of the loop stress and the axial stress depend, amongst others, on the wall-thicknesses of the inner tube 1 and the outer tube 3. If these wall-thicknesses were equal, the magnitude of the hoop stress would be approximately twice the magnitude of the axial stress. Since in the example shown the wall-thicknesses of the inner tube 1 is about twice the wall-thickness of the outer tube 3, a stress distribution is achieved wherein the magnitude of the hoop stresses is approximately equal to the magnitude of the axial stress.

Since the outer tube 3 is connected to the end caps 9,11, the axial distance between the end caps 9,11 increases a limited amount due to the axial elongation of the outer tube 3. The distance between the ends of the inner tube 1 decreases a limited amount due to the axial contraction of the inner tube 1. Thus, the ends of the inner tube 1 slide axially relative to the end caps 9,11 over a limited distance. It will be clear to a person skilled in the art that the magnitude of this limited distance depends on geometry, material properties and internal pressure, and that the depth of the grooves should be at least equal to said magnitude in order that the sealing rings 35,37 retain their sealing function.

It will be appreciated that any other suitable sealing means can be applied, for example bridgeman-type seals.

Various modifications of the present invention will become apparent to those skilled in the art from the foregoing description and accompanying drawings. Such modifications are intended to fall within the scope of the appended claims.

I claim as my invention:

1. A pressure vessel comprising a first cylindrical wall for bearing circumferential loads, a second cylindrical wall for bearing axial loads, said first and second walls being concentrically arranged, two end caps arranged at opposite ends of the vessel and rigidly connected to the second cylindrical wall, at least one of the end caps being axially slidable relative to the first cylindrical wall, and sealing means arranged between the first cylindrical wall and slidable end cap.

2. The pressure vessel of claim 1, wherein both end caps are axially slidable with respect to the first cylindrical wall.

3. The pressure vessel of claim 1, wherein the second cylindrical wall is arranged around the first cylindrical wall.

4. The pressure vessel of claim 1, wherein the first cylindrical wall is manufactured of fibre reinforced plastic such that the fibres extend substantially in the circumferential direction of the wall.

5. The pressure vessel of claim 1, wherein the second cylindrical wall is manufactured of fibre reinforced plastic such that the fibres extend substantially in the axial direction of the wall.

6. The pressure vessel of claim 1, wherein the thickness of the second cylindrical wall is at least half the thickness of the first wall.

7. The pressure vessel of claim 1, wherein the first cylindrical wall extends at both ends in inner annular grooves defined in the end caps.

8. The pressure vessel of claim 1, wherein the inner annular grooves have cylindrical inner surfaces, and the sealing means are arranged between the inner side of the first cylindrical wall and the cylindrical inner surfaces of the inner grooves.

9. The pressure vessel of claim 1, wherein the second cylindrical wall is provided with tapered end parts extending in outer annular grooves of the end caps, which end parts are locked in the outer annular grooves by tapered steel rings, which rings are screwed into the outer grooves.

* * * * *